3,192,026
METHOD OF TREATING SILICA FIBERS
Robert C. Nordberg, 14730 Gardenhill, La Mirada, Calif., and Forrest J. Lunn, 630 W. Burnett, Long Beach, Calif.
Filed Oct. 19, 1959, Ser. No. 15,249
(Filed under Rule 47(a) and 35 U.S.C. 116)
5 Claims. (Cl. 65—111)

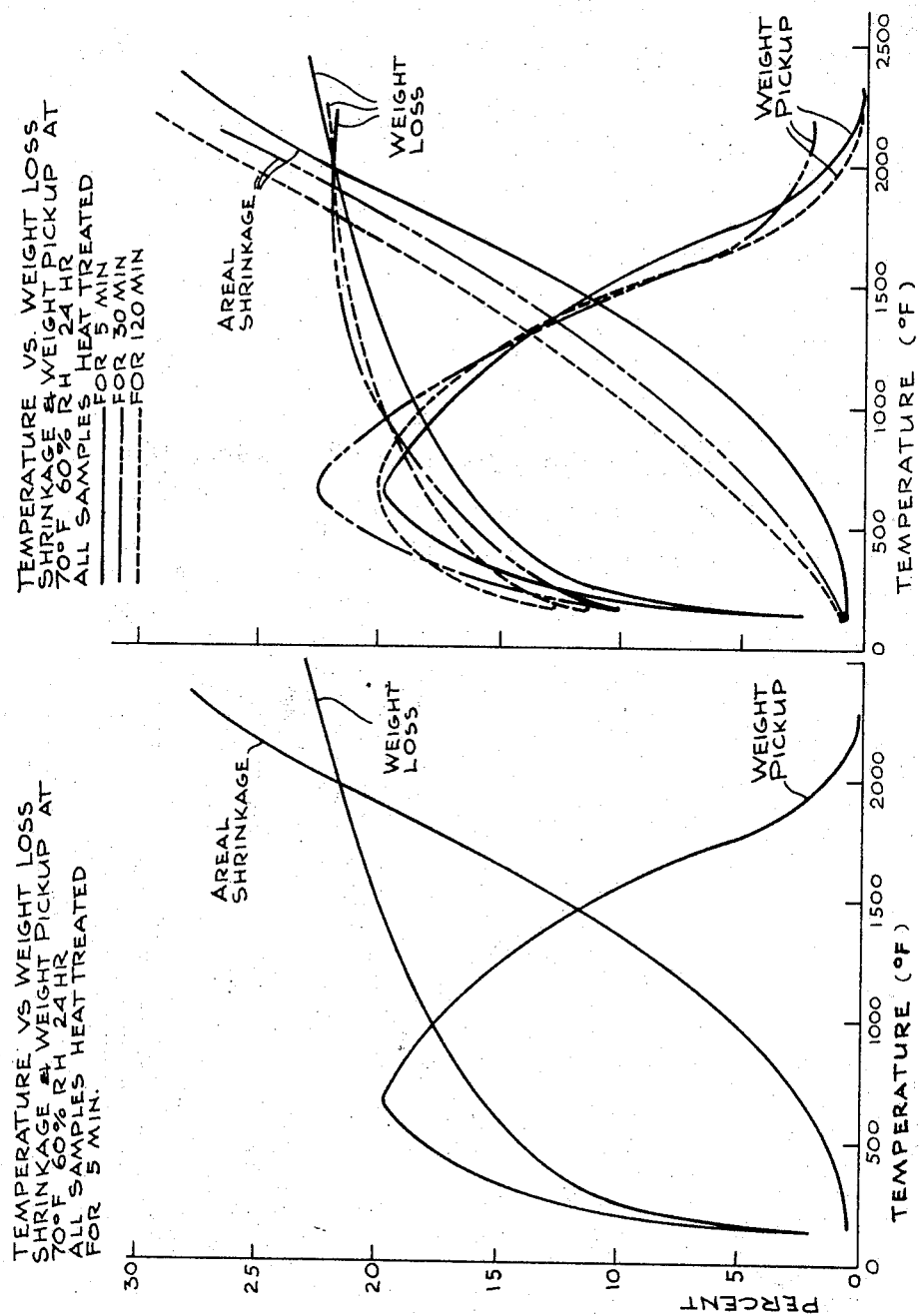

This invention relates to silica fiber structures and more particularly to processes and materials which provide vitreous silica fiber structures of controlled absorption properties.

It is now generally known that vitreous silica fibers are particularly suited for a number of practical applications. The fibers may be processed as various textiles or formed into batts, rovings, or other configurations and the fibers are often coated with resins or other finishes. In whatever form the silica fibers are used, they have a number of high temperature properties of great utility. The fibers do not melt or vaporize below 3000° F. and are of adequate strength for most applications. They have, in addition, excellent resistance to thermal shock and chemical stability. Thus, in batt form the fibers are extensively used as thermal insulators. Various woven forms are used for high temperature electrical spacers, reinforcing for plastic laminates and the like. Many uses arise because of the excellent resistance to ablation possessed by vitreous silica fibers.

In general, vitreous silica fibers are most efficiently produced by extracting the non-siliceous oxides from non-chemically resistant glass fibers having relatively high silica contents. The extraction is carried out by leaching in a suitable acid bath until the non-siliceous oxides are reduced to a point at which the silica content of the remaining fibers is greater than 90%. Usually, the silica content of the remaining fibers is in the range from 96% to 99% or more on a dehydrated basis. Thereafter, the salts remaining from the leaching process are washed out of the silica fibers and the hydrated fibers are dried. The water of hydration and adsorbed water may be removed, and the fibers may be shrunk, by firing at an elevated temperature.

The diameters of the resultant individual fibers range from sub-micron sizes to approximately 20 microns. While appearing to the eye to be smooth, they are actually extremely porous. The irregular internal configuration of the silica fibers and the presence of many reentrant cavities cause the fibers to have a tendency to reabsorb constituents from their environment.

It has for some time been recognized that vitreous silica fibers of these general properties have characteristics which are useful in other applications than those mentioned above. It has heretofore been difficult, however, to so control the processing of the fibers as to be able to optimize these particular characteristics, or even to reproduce results consistently. It has been recognized, for example, that the silica fibers have excellent potentialities for use in silica gels and silica gel-like structures, because of their extremely high surface area in relationship to volume. Similarly, it is known that the electrical properties of vitreous silica are in many respects similar to and to and in some respects superior to those of fused quartz. The difficulties which have heretofore been encountered in reproducibly providing silica fibers which fully utilize these potentialities, however, have heretofore prevented their extensive use.

The class of materials which have come to be known as silica gels are widely employed as carriers for catalytic agents and for their ability to accumulate moisture, gases, or solid particles. The so-called microamorphous variety of silica, diatomite, has the property of concentrating relatively dilute substances from the surrounding medium on its surface and accordingly has been widely used as a filtering mechanism for impure oils and other liquids. Silica gels are widely used as oil filtering agents, for absorbing water from a mixture of less condensable gases and for fractionation by differential absorption.

Usually, the silica compositions which have been used for these purposes have been in the form of powders or small particle structures. It is obvious that such structures cannot be formed into a self-supporting bed or contained in a relatively large volume without the use of special containment agents or structures. Continuous silica fibers, on the other hand, may readily be formed into a self-supporting bed structure to serve as a catalyst or filtration base.

At this point it should be noted that in this specification and in the claims the manner in which silica fibers accumulate moisture or other agents is referred to as absorption, or reabsorption. It is considered that such terms more accurately describe the process of accumulation than does the term adsorption, partly because reaccumulated moisture will include water of hydration as well as surface moisture. In addition, the surface moisture is preponderantly on internal surface areas, and the fibers appear and feel dry.

The potentiality of vitreous silica fibers for electrical applications has also been recognized, particularly for electrical devices operating in the higher signal frequencies. The dielectric constant of vitreous silica is substantially like that of fused quartz. More significantly, however, the loss tangent, or power factor, of vitreous silica fibers is relatively low over an extremely broad frequency range. While the dielectric constant may not vary appreciably with frequency, the power factor may vary widely with frequency. The power factor is critical, inasmuch as in the transmission of electrical energy the losses incurred due to the presence of a dielectric vary directly with the power factor as frequency increases.

A specific illustration of the suitability of vitreous silica fibers for electrical applications is in dielectric support elements in microwave guide devices. Coaxial cables are used as standard components, for example, in what are known as the ultra high frequency and the microwave frequency regions of the frequency spectrum. A coaxial cable consists of a hollow outer conductor and a central inner conductor which is concentric with the outer conductor. Waves of given wave lengths are confined within and transmitted along the coaxial cable between the two conductors. Vitreous silica fiber structures are useful for precisely spacing and supporting the inner conductor with respect to the outer conductor.

Many requirements are imposed upon the dielectric structures used as support elements in coaxial cables, as is illustrated by the difficulties encountered with prior art devices. Some coaxial cable structures employ glass beads, or beads of other material, at spaced points along the inner conductor to maintain the inner conductor in position. These bead structures have been both electrially lossy and of varying electrical characteristics. Accordingly, bead supported structures have been supplanted for most applications by rigid conductive stubs which are of a length chosen to cause wave reflections to cancel. The stubs, however, are rigid and materially increase the size, complexity and cost of the coaxial line. It would be preferable to employ a spacing structure which is consistently reproducible on a mass production basis, which does not dissipate much electrical energy, and which is suitable for use in flexible coaxial cables.

In order to be usable at high power, and under widely varying conditions of operation, the coaxial cable should be constructed so as to be relatively free from the effects of voltage and thermal breakdown. Voltage breakdowns arise because of corona discharges occurring across gaps existing in dielectric spacer elements in a coaxial cable. In many flexible coaxial cables, for example, the center spacer is an extruded dielectric, but includes air bubbles because of imperfections in the extrusion process. The voltage gradient across these air bubbles can be appreciable under even normal operating power levels. Accordingly, a corona discharge occurs which gradually eats away the dielectric. Like effects occur if there is imperfect contact between the dielectric and the outer or the inner conductor. Thermal losses, on the other hand, are due largely to the dissipation of energy in the dielectric, and to the consequent heating of the dieelctric. When energy is transmitted for relatively long intervals, this heating can result in a sufficiently high temperature to damage the dielectric, and consequently the waveguide.

It is recognized that the presence of moisture is the principal factor which has prevented obtaining satisfactory dielectrics for microwave applications. Dielectrics having good power factors, such as quartz, can vary widely in moisture characteristics. The variations depend upon previous thermal and gaseous histories and upon the environments in which the materials are contained. Vitreous silica, as heretofore available, has likewise been subject to variations in moisture content and characterstics. Because moisture is extremely lossy, electrically speaking, the importance of maintaining moisture at a minimum, or at least at selected levels, will readily be apparent. In addition, however vitreous silica fibers to be employed as dielectric support elements should have sufficient strength to be woven or otherwise processed into any desired configuration, and to thereafter maintain the elements in a closely fixed spatial relation whether or not the cable is to be subject to flexure.

It will be recognized that the specific microwave application discussed is merely one of a whole family of applications for such elements. The power factor of a dielectric is directly related to lost energy and thus is extremely important at virtually all frequencies. There are a number of other applications in which obtaining a minimum of moisture is desirable. For example, it is known that the presence of moisture on reinforcing fibers used in a resin can often have an inhibiting effect on the cure of the resin. When the factors affecting the cure become critical, therefore, it may also be desirable to be able to closely control the moisture content.

It is therefore an object of the present invention to provide new vitreous products having controllable absorption properties.

It is another object of the present invention to provide improved methods for processing vitreous fibers so as to provide selected absorption characteristics.

It is yet another object of the present invention to provide methods of processing vitreous silica fibers so as to attain peak absorption properties.

Yet another object of the present invention is to provide methods of processing vitreous silica fibers so that the fibers have a minimum weight pickup upon exposure to normal environmental conditions subsequent to the processing.

Another object of the invention is to provide improved forms of catalyst carrier and silica gel structures using vitreous silica fibers.

Yet another object of the present invention is to provide vitreous silica fiber products of controlled absorption characteristics.

A further object of the present invention is to provide a self-supporting bed of vitreous silica fibers which have higher percentages of adsorbed constituents than has heretofore been possible.

A further object of the present invention is to provide vitreous silica fiber products of sufficient strength for normal processing but having lower moisture contents than has heretofore been feasible on a production basis.

Still another object of the present invention is to provide elements for use in electrical applications, which elements have an extremely low power factor which can be maintained within relatively close limits.

These and other objects are achieved, in accordance with the present invention, by so processing vitreous fibers as to maintain a controlled relation between the weight loss and the areal shrinkage of the fibers. Vitreous silica fibers may be provided by leaching out the nonsiliceous oxides. In the subsequent firing of these vitreous silica fibers certain relationships between the loss of weight and the areal shrinkage of the fibers are used to provide a minimum or maximum weight pickup, as desired, from moisture or other constituents in the surrounding environment.

In accordance with particular features of the invention, the vitreous silica fibers are processed such that the ultimate product has maximum weight pickup and is most suitable for catalyst carriers and the like. Following the reduction of the nonsiliceous oxides and the washing of the salts from the fibers, the vitreous silica fibers remaining are maintained at a temperature sufficient for the weight loss to be appreciable, while the areal shrinkage is relatively minor. The firing temperature and time are such that the difference between the weight loss and the areal shrinkage is a maximum. Subsequent to firing in this manner, the vitreous silica fibers may be placed in a controlled environment and absorb a maximum of selected constituents, such as moisture, gases or solid particles for use in a catalyst structure.

In accordance with other features of the present invention, the processing of the vitreous silica fibers may be such as to cause the fibers to have minimum weight pickup subsequent to the firing. Here a relatively equal relationship is maintained between the weight loss in the fibers and the areal shrinkage occurring during the firing. It has been found that when this relationship is observed, the fibers pick up minimal amounts of moisture without having been devitrified to the point at which they are not strong enough for further processing. Electrical products having extremely low power factors and closely controllable characteristics may accordingly be provided on a mass production basis.

A better understanding of the invention may be had by reference to the following description, taken in conjunction with the accompanying drawing, in which:

FIG. 1 is a graphical representation of changes in weight loss, weight pickup and areal shrinkage of vitreous silica fibers when fired for 5 minutes at varying temperatures, and FIG. 2 is a graphical representation of variations in weight loss, weight pickup and areal shrinkage of vitreous silica fibers when fired for varying times at different temperatures.

The manner in which glass fibers are treated so as to produce vitreous silica fibers is described in some detail in a number of sources. The principal steps involved need therefore be discussed only in summary fashion. The glass fibers themselves which are initially used are those which are not chemically resistant, and in general may be of the class known as E type fibers.

The fibers, varying from approximately submicron to 20 micron diameters, may be processed in the form of textiles of various kinds, in batt form, in loose masses or in some other fabricated form. The fibers are then leached in an acid bath which extracts the metal oxide constituents other than silica. It has been preferred to use HCl in a concentration of from .1 N to 5 N. In order to minimize the leaching time, the acid bath is usually maintained at an elevated temperature, and a relatively high strength acid concentration is employed. The leaching proceeds until substantially all of the oxides other than silica have been extracted.

The resultant fibers are extremely porous, with many internal and reentrant cavities. They are in excess of 90% $SiO_2$ and usually will be in the range of from 96% to 99.9% $SiO_2$, on a dehydrated basis. The leaching process does not, however, significantly reduce the diameter of the fibers. The fibers are then washed to rid the fibers of the chloride salts, both soluble and insoluble, which are formed during leaching, and to leave the fibers substantially free of acid. Following this, the hydrated fibers are dried until excess moisture is removed, although the absorbed moisture, including the water of hydration and adsorbed moisture, remain.

In order to drive off the adsorbed moisture and to shrink the fibers, they have heretofore been fired in the range from 1200° to 1700° F. This process has resulted in the temporary removal of substantially all moisture, but in an indefinite control over the weight pickup properties of the fibers. Under normal atmospheric conditions, the fibers will reabsorb moisture. This weight pickup may be viewed as a reconstitution of the fibers with moisture. In the firing step, the fibers are shrunken both in diameter and length. The fibers are white in color and of a silky texture, and while they are dry to the touch they nonetheless contain an appreciable amount of adsorbed moisture. The shrinking is an irreversible process, because the fibers dot not later expand or contract with further temperature changes.

As described above, control of the absorption and reconstitution properties of a fired fiber is extremely important if maximum or minimum weight pickup is to be achieved for particular applications. A significant feature of the present invention is that desired weight pickup characteristics can be obtained by controlling the firing of hydrated fibers and the subsequent processing steps in accordance with certain critical relationships. The relationships involved may be better understood by reference to FIG. 1, which is a chart of percentage changes occurring in various physical characteristics of the fibers, plotted against firing temperatures in ° F.

While the relationships of FIG. 1 obtain also for the general case, the chart was prepared in a manner which woud insure uniformity. The manner of preparation was as follows: A sample of high silica fiber cloth having approximately 98.5% $SiO_2$ on a dehydrated basis, was dried for approximately 16 hours at room temperature immediately following washing. The cloth was cut into square sections of known size and weight, and the sections were fired at different temperatures in the range shown in FIG. 1. All samples were fired for 5 minutes. After firing, the materials were weighed immediately, then placed in a humidity cabinet for 24 hours at 60% relative humidity at 70° F. On measuring the size and weight of the shrunken samples after firing, the variations of weight loss, weight pickup and areal shrinkage for different firing temperatures obtained were as shown in FIG. 1.

The chart of FIG. 1 thus illustrates the relationships which are observed in controlling weight pickup in accordance with the present invention. Note that a peak weight pickup is obtained in the vicinity of 600° to 650° F., while the weight pickup thereafter decreases with increasing temperature almost linearly until the region of approximately 1800° F. Moreover, these weight pickup maxima and minima are related to the correspondence between the weight loss and the areal shrinkage due to firing. Where the weight pickup is a maximum, the weight loss for that temperature is appreciable, but the areal shrinkage has not yet become significant. Whereas weight loss with temperature increases sharply and then tapers off, areal shrinkage increases slowly and then rises almost linearly with a sharper slope. At the temperature at which the weight pick-up is maximum, the rate of change of these curves (the slope of the curves or the derivative of the function) is substantially the same. At this point in the firing temperature range, therefore, there is the greatest difference between the weight loss and the areal shrinkage. It is this relationship which establishes the maximum reabsorption of moisture or other constituents.

For a minimum weight pickup, however, it may be seen that the weight loss should be approximatey equal to the areal shrinkage. As temperatures increase to the region of approximately 200° F., the areal shrinkage gradually approaches and finally exceeds the weight loss. As this crossover point is approached with increasing temperatures, the weight pickup drops sharply, and finally tapers into the minimum, zero pickup. By the observation of this relationship, together with the strength and other characteristics of the fibers, it is now feasible to closely control the absorption characteristics of the fibers. Note that both maximum and minimum weight pickup results in accordance with the invention are characterized by approximate maximization of the difference between areal shrinkage and weight pickup, and temperatures below the devitrification level.

The critical relationships are not dependent solely upon temperature, as may be seen by reference to the curves of FIG. 2. Therein are shown in solid and differently configured dashed lines the variations of the factors of FIG. 1 for times of firing of 5 minutes, 30 minutes and 120 minutes, respectively. As the period of heat treatment is increased, the areal shrinkage and the weight loss also increase over a principal part of the range of firing temperatures. The effect on the weight pickup characteristic is to increase the weight pickup by several percent through the use of a 30 minute firing period. The same period, however, somewhat increases the minimum weight pickup which can be achieved.

In manufacturing a product suitable for a silica gel or other form of catalyst carrier, using maximum reabsorption characteristics, the firing temperature which is maintained is accordingly in the approximate range between 600° and 650° F. The principal variable is the temperature, which in the 600°–650° F. range is sufficient for the weight loss to be appreciable (15% or more) while the areal shrinkage is not yet significant (approximately 5% or less). Lesser variations in the weight pickup can be made by varying the duration of the firing, intermediate intervals such as 30 minutes being suitable for this purpose.

The final step in the manufacture of a suitable silica gel product is accordingly the exposure of the fired fibers to an appropriate liquid, gaseous or dilute particle environment. Because of the nature of the surface possessed by the silica fibers, the internal cavities within the porous fibers may be considered to trap relatively dilute elemental substances from the surrounding medium, so as to condense and concentrate the substances within the silica fibers. In some applications, the silica fibers may be placed directly in an environment from which undesired constituents are to be extracted. Thus, they may be used for their desiccant properties in removing moisture, or they may be used for filtration or to absorb vapors and gases such as those of hydrocarbons, alcohols and acetone. Similarly, water may be absorbed from a mixture of less condensable gases, or a gas mixture may be fractionated due to the differential absorption characteristics of the fibers.

The same principles apply where the fibers are to be used as a catalyst carrier, but in such event the fibers are exposed to the atmosphere which is desired to be absorbed. Thereafter, after maximum absorption, the fibrous structure containing the catalyst medium may be safely handled and physically disposed as desired.

However it is used, the fibrous structure constitutes a self-supporting bed having a selected dimensional spacing between the fibrous elements. Thus, in the form of a cloth or as a batt the fibers are relatively uniformly disposed throughout the volume they occupy, but contain sufficient openings between them to permit relatively free flow of the medium in which they are contained.

The use of the relationship between areal shrinkage and weight loss may effectively be utilized in other ways. The means by which maximum weight loss relative to shrinkage is obtained, need not be a conventional firing furnace but can instead be a source of flash heat. Similarly, the water may be extracted by suspending the fibers above a concentrated acid having very strong affinity for water, and maintaining a temperature sufficient for the water to be absorbed by the bath. Consequently, it is a significant departure from prior art techniques to continue the dehydration and shrinking until the rate of change of areal shrinkage equals and begins to exceed the rate of change of weight loss. It will be recognized that the removal of the water is a firing or heat treating step rather than a mere drying of the fibers, which would not involve shrinkage.

A relationship of approximate equality between weight loss and areal shrinkage is employed in determining minimum ultimate weight pickup properties for silica fibers. Modifications are made, however, in order to achieve strength in the product. The reason for this is that at temperatures approximateing 2100° F. the vitreous silica fibers tend to devitrify, in which condition they crumble and break apart. Such temperatures must be approached in bringing areal shrinkage to the level of weight loss. While close control over electrical properties is required, in order to minimize the power factor, the processed fibers must have an appreciable strength in order to be fabricated in desired shapes and combinations. Accordingly, while for these purposes weight loss should be approximately equal to areal shrinkage, areal shrinkage usually should be slightly less in order for the strength to be sufficient. As may be seen from FIGS. 1 and 2, the weight pickup following firing in the region of 1800° F. is between 1% and 3%. Although lower figures may be achieved it has been found that they are obtained only at the expense of appreciable loss in physical characteristics. Temperatures of approximately 1800° F. maintained for 3 hours are accordingly used in practical processes.

The fiber structures provided by observing this relationship have many electrical properties like those of fused silica, but are not subject to the moisture variations which have heretofore been so often encountered in practical applications. Furthermore, the fibers are of such high melting point that there is essentially no thermal breakdown problem, and they are strong enough and flexible enough to be used in a wide variety of electrical applications. Although they have approximately the same dielectric constant as fused silica and fused quartz, 3.78, the fibers much more closely approach the loss tangent (which may be equated to the power factor for values below 0.1) properties of fused silica than they do of fused quartz. This is significant, as may be seen from the following table of loss tangent variations of fused quartz and fused silica with frequency:

| Frequency | Loss tangent fused quartz | Loss tangent fused silica |
| --- | --- | --- |
| $1 \times 10^2$ cps | .00085 | .00066 |
| $1 \times 10^5$ cps | .00040 | .00004 |
| $1 \times 10^6$ cps | .00020 | .00001 |
| $1 \times 10^8$ cps | .00010 | .00003 |

Structures fabricated from the fired dehydrated fibers have different operating characteristics, of course, depending upon the manner of fabrication, the density of the fibers, and whether the waveguide is under vacuum or contains a gaseous atmosphere. The most important loss measurement is the signal attenuation for a given length of waveguide, and in this respect devices fabricated in accordance with the present invention have proven to be markedly superior (to have less attenuation) than devices heretofore available.

The phenomena which occur in the silica fibers to make weight pickup characteristics dependent upon the weight loss and areal shrinkage relationship, are not fully understood. They are thought, however, to have some relation to the nature of the shrinkage and perhaps to minute surface devitrification effects.

It is also recognized that the presence of various gases and the previous thermal history of a vitreous silica have effects upon the crystallization of the silica. It is considered that the combination of the leaching, washing and drying process with firing in the manner previously described aids appreciably in gaining uniformity.

While it has previously been suggested that the hydration properties of silica fibers might effectively be utilized by firing at temperatures in the range of 400° F. to 500° F. and alternatively at temperatures below 385° F., it should be recognized that these suggestions did not comprehend the manner in which maximum pickup may be obtained, or the factors which influence the control of pickup. Similarly, while there have been discussions of the use of various temperature ranges for firing, there has not been any understanding of the relationships involved in minimizing weight pickup. It will be found that weight pickup conditions are not specified and that the manner of measuring moisture is not defined. Thus, where "moisture content" is given it may refer to either or both free and combined moisture, determined on some basis unrelated to the reabsorption problems here discussed. Additionally, the figures may not specify the absence or use of previous heating steps above 100° C. Many of the studies previously available include only certain parts of the moisture present, such as water of hydration, and treat these together with external factors such as resin coatings.

While there have been described above various methods for producing fired silica fibers having controllable absorption characteristics, and products provided thereby, it will be appreciated that various modifications, variations and alternative forms are possible within the scope of the invention. Accordingly, the invention should not be considered to be defined by the foregoing description but should be taken to include those methods and materials falling within the scope of the appended claims.

What is claimed is:

1. The method of producing a mass of fired vitreous siliceous fibers having adequate strength for further processing and controlled moisture absorption characteristics, which method includes the step of firing a mass of hydrated silica fibers at a temperature within the range of from about 600° F. to about 2100° F., excluding temperatures within the range of in excess of about 650° F. and below about 1800° F. and below the devitrification point of said fibers for at least about five minutes, that is, until the difference between the percentage areal shrinkage of said fibers during said firing and the percentage weight pickup of said fibers after said firing is maximized.

2. The method of producing highly absorptive silica gel material, which method includes the step of firing a mass of hydrated vitreous silica fibers at a temperature of between about 600° F. and about 650° F. and for a time of at least about five minutes, that is, a time sufficient to dehydrate and shrink said fibers with approximately equal rates of change of areal shrinkage and weight loss with temperature and to provide a substantial weight pickup, when said fibers are exposed to moisture under normal environmental conditions subsequent to said firing.

3. The method in accordance with claim 2 wherein said fibers prior to said firing are leached of non-siliceous oxides and then washed, wherein said fibers have an average diameter of from less than 1 micron to about 20 microns, and wherein said fibers have a silica content in excess of about 90%, by weight, on a dehydrated basis.

4. The method of producing a mass of vitreous silica fibers having minimal moisture absorption characteristics and adequate strength for further processing, which method includes the step of firing a mass of hydrated vitreous silica fibers at a temperature of between about 1800° F. and about 2100° F., that is, below the devitrification point of said fibers for at least about five minutes, that is, for a time sufficient to provide said fibers with approximately equal percentages of areal shrinkage and weight loss, and a weight pickup below about 5 percent upon exposure to moisture under normal atmospheric conditions subsequent to said firing.

5. The method in accordance with claim 4 wherein before said firing said fibers are leached and washed substantially free of non-siliceous oxides, whereby said fibers have a silica content in excess of about 90 percent, by weight, on a dehydrated basis, and wherein said fibers have an average diameter of from less than 1 micron to about 20 microns.

References Cited by the Examiner
UNITED STATES PATENTS

| | | | |
|---|---|---|---|
| 2,461,841 | 2/49 | Nordberg | 65—4 |
| 2,491,761 | 12/49 | Parker | 41—42 |
| 2,635,390 | 4/53 | Parker | 65—31 |
| 2,643,487 | 6/53 | Parker | 156—24 |
| 2,843,461 | 7/58 | Labino | 65—31 |
| 2,954,421 | 9/60 | McCarthy et al. | 174—102 |

DONALL H. SYLVESTER, *Primary Examiner.*

CHARLES R. HODGES, *Examiner.*

UNITED STATES PATENT OFFICE
CERTIFICATE OF CORRECTION

Patent No. 3,192,026

June 29, 1965

Robert C. Nordberg et al.

It is hereby certified that error appears in the above numbered patent requiring correction and that the said Letters Patent should read as corrected below.

Column 1, line 62, strike out "to and"; column 3, line 5, for "imperforations" read -- imperfections --; line 13, for "dieelctric" read -- dielectric --; same column 3, line 29, after "however" insert a comma; column 5, line 23, for "dot" read -- do --; line 68, for "pick-up" read -- pickup --; column 6, line 4, for "200° F." read -- 2000° F. --; column 7, line 19, for "approximateing" read -- approximating --.

Signed and sealed this 21st day of December 1965.

(SEAL)
Attest:

ERNEST W. SWIDER

Attesting Officer

EDWARD J. BRENNER

Commissioner of Patents